United States Patent
Staple et al.

(10) Patent No.: US 10,386,241 B1
(45) Date of Patent: Aug. 20, 2019

(54) CALIBRATION SYSTEM AND METHOD

(71) Applicant: Ball Aerospace & Technologies Corp., Boulder, CO (US)

(72) Inventors: Bevan D. Staple, Longmont, CO (US); Matthew L. Gross, Boulder, CO (US); Jerold L. Cole, Superior, CO (US); John C. Fleming, Boulder, CO (US); Sandra R. Collins, Louisville, CO (US); Beth H. Kelsic, Longmont, CO (US)

(73) Assignee: Ball Aerospace & Technologies Corp., Boudler, CO (US)

( * ) Notice: Subject to any disclaimer, the term of this patent is extended or adjusted under 35 U.S.C. 154(b) by 0 days.

(21) Appl. No.: 15/894,629

(22) Filed: Feb. 12, 2018

Related U.S. Application Data

(60) Provisional application No. 62/457,639, filed on Feb. 10, 2017.

(51) Int. Cl.
*G01J 5/52* (2006.01)
*G01J 5/08* (2006.01)
*G01J 5/10* (2006.01)
G01J 5/00 (2006.01)

(52) U.S. Cl.
CPC .............. *G01J 5/522* (2013.01); *G01J 5/0806* (2013.01); *G01J 5/10* (2013.01); *G01J 2005/0048* (2013.01)

(58) Field of Classification Search
CPC ............ G01J 5/522; G01J 5/0806; G01J 5/10
See application file for complete search history.

(56) References Cited

U.S. PATENT DOCUMENTS

| | | |
|---|---|---|
| 5,602,389 A | 2/1997 | Kato et al. |
| 5,608,838 A | 3/1997 | Brookley |
| 5,822,222 A | 10/1998 | Kaplinsky et al. |
| 7,001,068 B2 | 2/2006 | Howard |
| 7,068,366 B2 | 6/2006 | Burk |
| 8,101,905 B2 | 1/2012 | Rogers |
| 8,556,501 B2 | 10/2013 | Topham et al. |
| 8,569,701 B2 | 10/2013 | Reda |
| 8,657,487 B2 | 2/2014 | Bingham et al. |
| 8,748,808 B2 | 6/2014 | Le Noc et al. |

(Continued)

OTHER PUBLICATIONS

Emery et al. "Estimating Sea Surface Temperature From Infrared Satellite and In Situ Temperature Data," Bulletin of the American Meteorological Society, Dec. 2001, vol. 82, No. 12, pp. 2773-2786.

(Continued)

*Primary Examiner* — Hugh Maupin
(74) *Attorney, Agent, or Firm* — Sheridan Ross P.C.

(57) ABSTRACT

A calibration system for sensors is provided. The calibration system includes an array of blackbody elements. Each blackbody element includes a high emissivity surface. The high emissivity surface can be formed using carbon nanotubes. In addition, each blackbody element includes a heating element and a temperature sensor. The heating element is operated to bring the blackbody element to a set point temperature, as determined by the temperature sensor. As an example, the calibration system can be used in connection with sensors sensitive to infrared wavelengths that is carried by a satellite or other platform.

21 Claims, 9 Drawing Sheets

(56) References Cited

U.S. PATENT DOCUMENTS

| | | | |
|---|---|---|---|
| 8,895,997 B2 | 11/2014 | Maki et al. | |
| 9,086,327 B2 | 7/2015 | Chow et al. | |
| 9,182,298 B2 | 11/2015 | Yagoubov | |
| 9,212,968 B1 | 12/2015 | Smith et al. | |
| 9,425,254 B1 | 8/2016 | Gross et al. | |
| 2008/0036356 A1* | 2/2008 | Ward | B82Y 10/00 |
| | | | 313/341 |
| 2010/0006761 A1* | 1/2010 | Johnson | G01J 3/02 |
| | | | 250/343 |
| 2011/0168256 A1* | 7/2011 | Wang | H01L 31/03522 |
| | | | 136/258 |
| 2015/0142364 A1 | 5/2015 | Workman | |
| 2017/0089759 A1* | 3/2017 | Fleck | G01J 1/4257 |
| 2017/0108383 A1* | 4/2017 | Chow | G01K 7/02 |
| 2018/0180981 A1* | 6/2018 | Crawford | G03B 21/60 |

OTHER PUBLICATIONS

Mizuno et al. "A black body absorber from vertically aligned single-walled carbon nanotubes," PNAS, Apr. 2009, vol. 106, No. 15, pp. 6044-6047.

Müller "Calibration and Verification of Remote Sensing Instruments and Observations," Remote Sensing, 2014, vol. 6, pp. 5692-5695.

Zhou et al. "An Overview of In-Orbit Radiometric Calibration of Typical Satellite Sensors," The International Archives of the Photogrammetry, Remote Sensing and Spatial Information Sciences, 2015, vol. XL-7/W4, pp. 235-240.

* cited by examiner

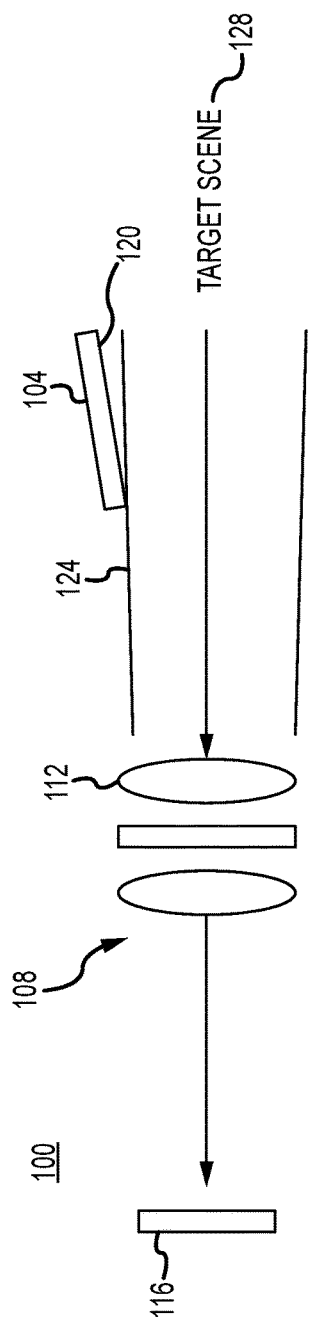
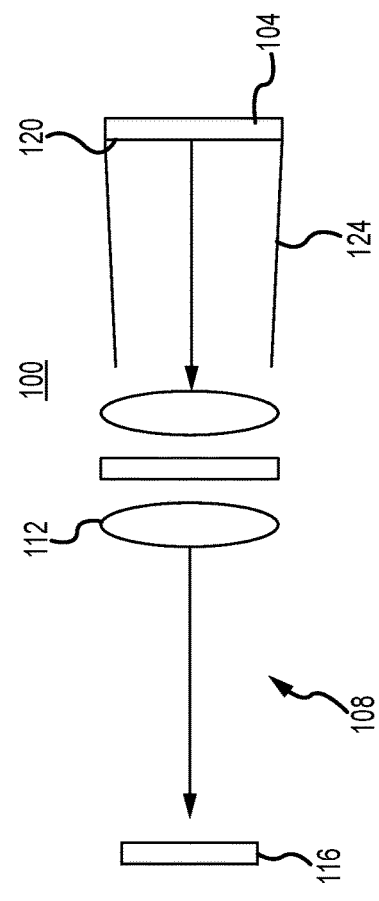
FIG.2A
FIG.2B

CALIBRATION SYSTEM AND METHOD

CROSS-REFERENCE TO RELATED APPLICATIONS

This application claims the benefit of U.S. Provisional Patent Application Ser. No. 62/457,639 filed Feb. 10, 2017, the entire disclosure of which is hereby incorporated herein by reference.

FIELD

Calibration systems and methods are provided. The system can include a controlled surface formed from an array of blackbody elements that each incorporate a heating element.

BACKGROUND

Infrared sensors have a variety of applications. For example, infrared imagery has become an important part of climate studies, weather forecasting, severe storm tracking, meteorology research, geoscientific studies, and other applications. More particularly, infrared radiation from the Earth's surface and atmosphere can be detected using instruments carried by satellites to provide information regarding various phenomena. However, accurate calibration of such instruments is essential to detection accuracy. The evolution of remote sensing missions presents a growing need for satellite sensors with significantly enhanced measurement accuracies beyond current capabilities.

Infrared instruments are typically calibrated before they are deployed (i.e. prior to launch) to high degree of accuracy. However, the accuracy of such instruments will invariably degrade over time. Accordingly, periodic recalibration is required in order to maintain desired levels of accuracy. For example, the on-board calibration needed for very precise (e.g., <1% radiance uncertainty), spectrally resolved IR radiances typically requires the availability of high-emissivity (0.999) calibration blackbodies. Such high emissivity levels cannot be provided by conventional low emissivity or "black" surfaces. Indeed, even conventional "cavity blackbodies", which combine low emissivity surfaces and relatively deep cavities, have coating emissivities that are usually limited to 0.98. To achieve emissivities of higher than 0.995 they employ complex geometries, with a depth that is typically more than double the aperture diameter, which results in a relatively large size and weight. The size and mass of cavity type blackbodies can in turn make changing the temperature of such devices time consuming and can require large amounts of power. Accordingly, high performance cavity type blackbodies are expensive to produce, and are challenging to accommodate in space systems with limited size, weight, and power (SWaP) allocations. Therefore, although conventional high performance blackbodies can meet the <1% radiance uncertainty requirement, their cost and SWaP impacts are large.

As an alternative to other high emissivity blackbodies, such as cavity blackbodies, blackbody surfaces comprising a planar surface of carbon nanotubes have been proposed and developed. These surfaces can be much smaller in the third dimension (i.e. in a dimension along a line of sight of an instrument being calibrated) than cavity type blackbodies. In addition, such surfaces can provide good performance over a limited area. However, they can suffer from variations in surface temperature and emissivity. These variations increase with the area of the surface. Moreover, the relatively low mass of such surfaces can make them more susceptible to temperature instability and non-uniformity. Accordingly, the uniformity of carbon nanotube type blackbody surfaces has been insufficient for use as a calibration surface for high performance instruments.

SUMMARY

Embodiments of the present disclosure are directed to providing a high emissivity blackbody calibration surface. More particularly, a calibration device or surface that includes a plurality of flat plate blackbody elements having a high emissivity structure and a heating element is provided. The blackbody elements can each include a plurality of carbon nanotubes that extend from a substrate. In addition, each of the blackbody elements disclosed herein incorporates a heating element that can be used to raise the temperature of the associated element. In accordance with further embodiments of the present disclosure, each of the blackbody elements can include a temperature sensor. A plurality of the blackbody elements can be tiled or placed in an array that extends in two dimensions to provide a blackbody calibration surface of a desired area. The temperature of the blackbody elements can be individually monitored and controlled, allowing for a temperature gradient across the blackbody calibration surface to be reduced or minimized.

The blackbody elements include a high emissivity structure having a blackbody surface formed from vertically aligned or extending carbon nanotubes. More particularly, the carbon nanotubes can be grown such that they extend from an element substrate. While the surface of the element substrate from which the carbon nanotubes extend can be generally planar on a macro scale, that surface can be characterized by a roughness on a microscopic scale. In accordance with embodiments of the present disclosure, the surface roughness of the element substrate and the carbon nanotubes are dimensioned in consideration of the operational wavelengths of an instrument that is to be calibrated using the calibration device.

The blackbody elements in accordance with embodiments of the present disclosure can each additionally include a heating element. The heating element can be located on a surface of the element substrate that is opposite the surface from which the carbon nanotubes extend, and can be activated to control a temperature of the associated blackbody element. Moreover, embodiments of the present disclosure provide individual control of the heating elements of the blackbody elements, thus allowing a temperature of each of the blackbody elements to be separately controlled. In accordance with still other embodiments of the present disclosure, the blackbody elements can each include a temperature sensor.

A calibration device or system can include an array containing a plurality of the disclosed blackbody elements. More particularly, the blackbody elements can be arranged or tiled such that at least a portion of at least one edge of any one blackbody element abuts at least a portion of a perimeter edge of a neighboring blackbody element. To facilitate such an arrangement, the shape of the blackbody elements can be configured as squares, rectangles, octagons, triangles, or other shapes having edges that are configured to permit the creation of a device having a substantially continuous calibration surface. Moreover, the individual blackbody elements can feature substantially planar blackbody or high emissivity surfaces. The calibration surface of the device can also be planar or substantially planar. In accordance with further embodiments of the present disclosure, the blackbody elements can be placed on a surface of a calibration device substrate, also referred to herein as a support substrate. In accordance with still other embodiments, the support substrate can be associated with or can function as a cooling plate that removes heat from the blackbody elements.

A calibration device or system in accordance with embodiments of the present disclosure can include or can be operatively connected to a controller that monitors the temperature of the calibration surface, and that controls the operation of the heating element of each blackbody element independently of any of the other blackbody elements. The calibration device can therefore control the heating and thus the uniformity of the emitted radiation over discrete areas of the calibration surface, to present a constant radiance surface to a camera or other instrument. This individual monitoring control of discrete areas of the calibration surface allows the calibration surface to be scaled to provide a large surface area, while maintaining a desired level of uniformity of the emitted radiation across the calibration surface.

Additional features and advantages of embodiments of the present disclosure will become more readily apparent from the following description, particularly when considered together with the accompanying drawings.

BRIEF DESCRIPTION OF THE DRAWINGS

FIG. 2A depicts a sensing system including an instrument and an integrated calibration system in accordance with other embodiments of the present disclosure in a sensing mode;

FIG. 2B depicts the sensing system of FIG. 2A in a calibration mode;

DETAILED DESCRIPTION

Figure 1A:
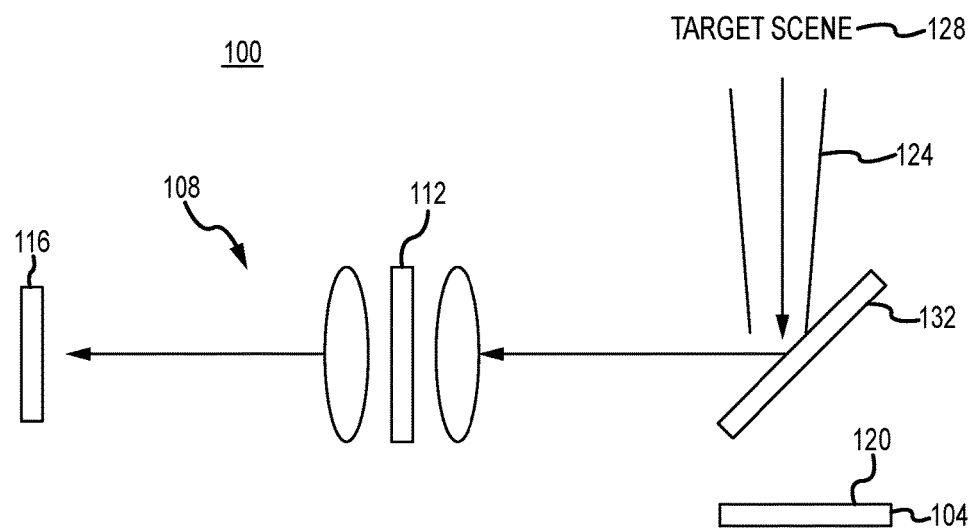
FIG. 1A depicts a sensing system including an instrument and an integrated calibration system in accordance with embodiments of the present disclosure in a sensing mode.
Figure 1B:
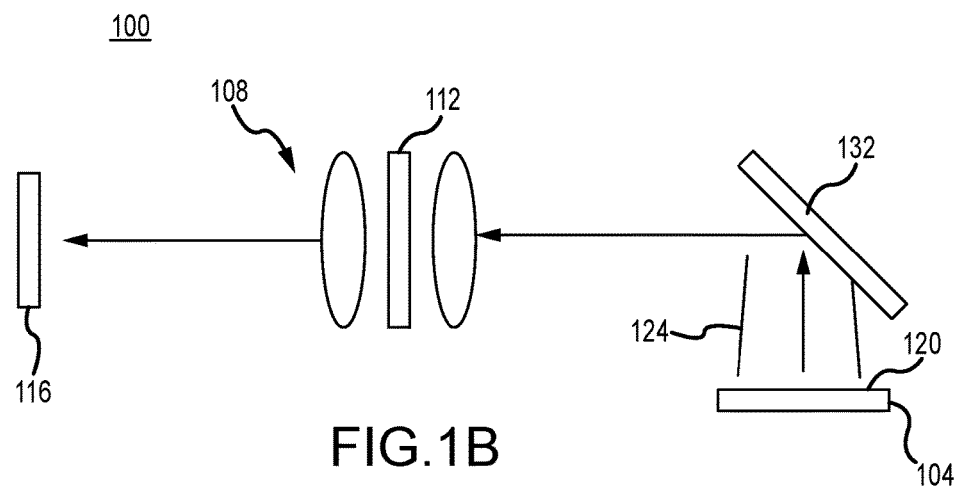
FIG. 1B depicts the sensing system of FIG. 1A in a calibration mode.

FIGS. 1A and 1B depict a sensing system 100 incorporating a calibration device or system 104 in accordance with embodiments of the present disclosure, and a sensor or instrument 108. As depicted, the sensor 108 can include an optical system 112 and a detector 116. As examples, but without limitation, the optical system 112 can comprise a telescope, and the detector 116 can comprise a focal plane array. In accordance with further exemplary embodiments, the focal plane array may be sensitive to light within a range of wavelengths, including but not limited to infrared wavelengths. In addition, the sensor or instrument 108 is one that requires calibration in order to provide desired measurement accuracy. As discussed herein, a calibration device 104 in accordance with embodiments of the present disclosure presents a relatively uniform, actively controlled, high emissivity calibration surface 120, that is suitable for calibrating highly sensitive instruments 108, including instruments that are carried by a satellite or other vehicle. The field of view 124 of the sensor 108 can be directed to either a target scene 128, or to the calibration device 104. For example, a mirror 132 can be rotated between a first position, depicted in FIG. 1A, in which the field of view 124 of the sensor 108 is directed to the target scene 128, and a second position, depicted in FIG. 1B, in which the field of view 124 of the sensor 108 is directed to the calibration device 104. As can be appreciated by one of skill in the art after consideration of the present disclosure, the mirror 132 can be incorporated into a rotating shroud that presents a low emissivity surface to the calibration device 104 when the mirror 132 and shroud are positioned such that the sensor 108 field of view 124 is directed to the target scene 128. By thus shielding the surface of the calibration device 104, the influence of external factors on the temperature of the calibration device 104 can be reduced, improving the thermal uniformity of the calibration device 104, and additionally reducing the power required to establish or maintain a temperature set point across the calibration device 104, as compared to a calibration device 104 that is entirely exposed to the ambient environment. When the mirror 132 and shroud are positioned such that the sensor 108 field of view 124 is directed toward the calibration device 104 (i.e. the sensing system 100 is in a sensor calibration mode), the calibration device 104 can be activated to provide a uniform temperature across the surface of the calibration device 104.

With reference now to FIGS. 2A and 2B, a sensing system 100 incorporating a calibration device or system 104 in accordance with other embodiments of the present disclosure is depicted. As in the previous example, the sensing system includes a calibration device or system 104, and a sensor or instrument 108. However, this further example differs in that the calibration device 104 can be moved between a first position (see FIG. 2A), in which the calibration device 104 is outside of a field of view 124 of the sensor 108, such that the sensor 108 can receive light from a target scene 128, and a second position (see FIG. 2B), in which the calibration device 104 entirely covers the field of view 124 of the sensor 108. As can be appreciated by one of skill in the art after consideration of the present disclosure, in the second position the calibration device 104 additionally functions as a shutter.

Figure 3:
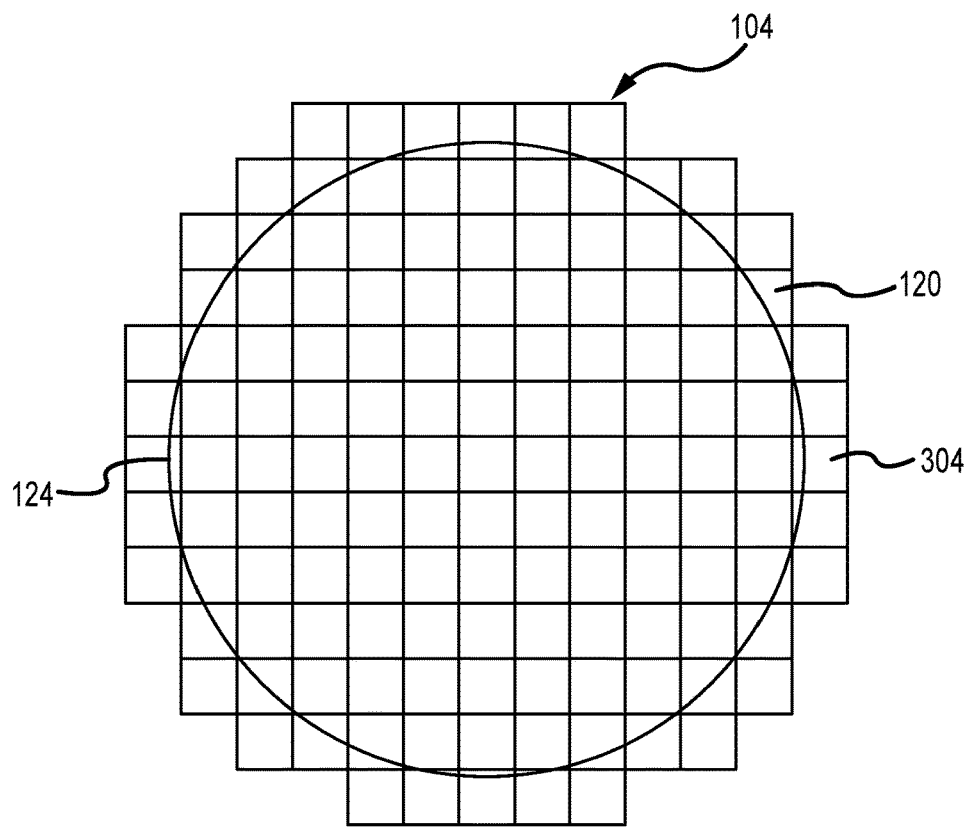
FIG. 3 depicts a surface of a calibration device in accordance with embodiments of the present disclosure.

With reference now to FIG. 3, a calibration device 104, and in particular the high emissivity calibration surface 120 of the calibration device 104, is depicted in plan view. In general, the calibration device 104 includes a plurality of blackbody elements 304. The blackbody elements 304 are placed in a two-dimensional array to form a high emissivity surface 120 with an area that approximates an area of the field of view 124 of an instrument 108 (depicted by a circle projected onto the area of the high emissivity calibration surface 120 shown in the figure), when a sensing system 100 including the calibration device 104 and a sensor 108 are in a calibration mode. The blackbody elements 304 can be arranged such that at least one edge of each blackbody element 304 abuts an edge of a neighboring blackbody element 304 in the array, thus providing a substantially continuous, high emissivity surface 120. Moreover, the overall size of the high emissivity calibration surface 120 presented by the calibration device can easily be scaled by adjusting the number of included blackbody elements 304. Although the areas of the individual blackbody elements 304 are depicted as squares, other shapes are possible. For example, each blackbody element 304 can be in the form of a rectangle, hexagon, triangle, parallelogram, or other shapes.

Figure 4:
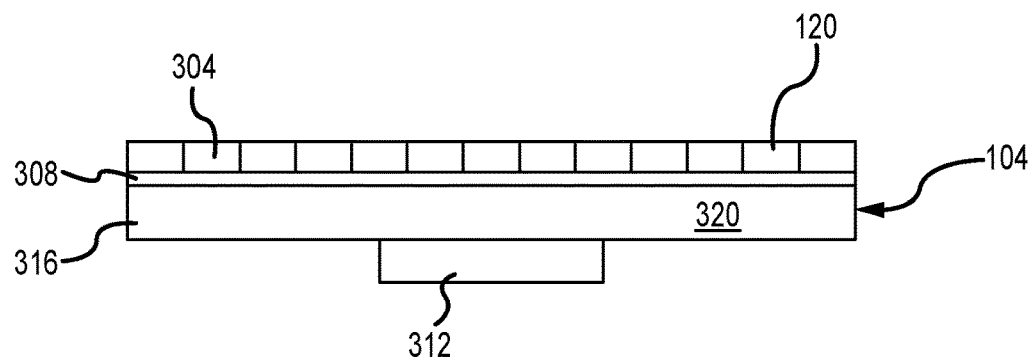
FIG. 4 depicts the calibration device of FIG. 3 in a side elevation view.

FIG. 4 depicts the calibration device 104 of FIG. 3 in a side elevation view. As shown, the blackbody elements 304 forming the high emissivity calibration surface 120 can be mounted or interconnected to a first substrate 308, such as a circuit board or wiring layer. The first substrate 308 can provide conductors for carrying signal lines and power between control electronics 312, also referred to herein as a controller, and the individual blackbody elements 304, as discussed in greater detail elsewhere herein. In addition, the first substrate 308 can provide structural support for the blackbody elements 304. Alternatively or in addition, the edges of adjacent blackbody elements 304 can be connected to one another, to form the high emissivity calibration surface 120. The calibration device 104 can additionally include a second substrate 316. The second substrate 316 can provide structural support to and/or electrical interconnections between other components of the calibration device 104. Alternatively or in addition, the second substrate 316 can be configured to provide a heat transfer function. For example, the second substrate 316 may comprise a heat transfer plate 320 that performs an energy removal (i.e. a cooling) function, and that assists in providing a calibration surface 120 having a selected, uniform temperature. For example, the heat transfer or cooling plate 320 can be associated with a refrigeration circuit or with a thermoelectric cooler. The control electronics 312 can generally include a power supply, one or more processors or chips, and memory, for use in the operation and control of the calibration device 104, as discussed in greater detail elsewhere herein.

Figure 5:
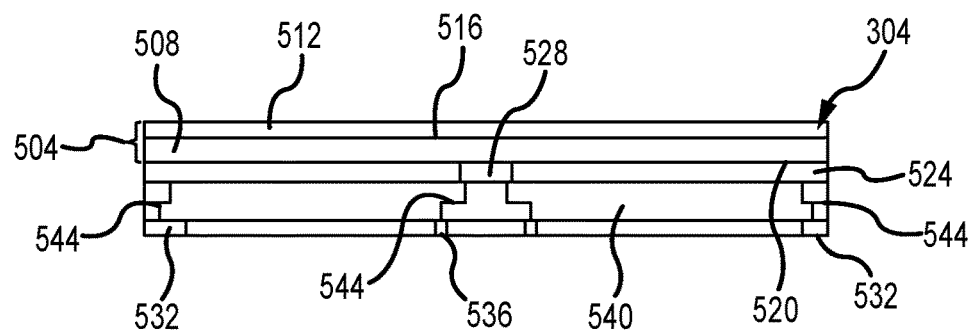
FIG. 5 depicts components of a blackbody element in accordance with embodiments of the present disclosure in a side elevation view.
Figure 6:
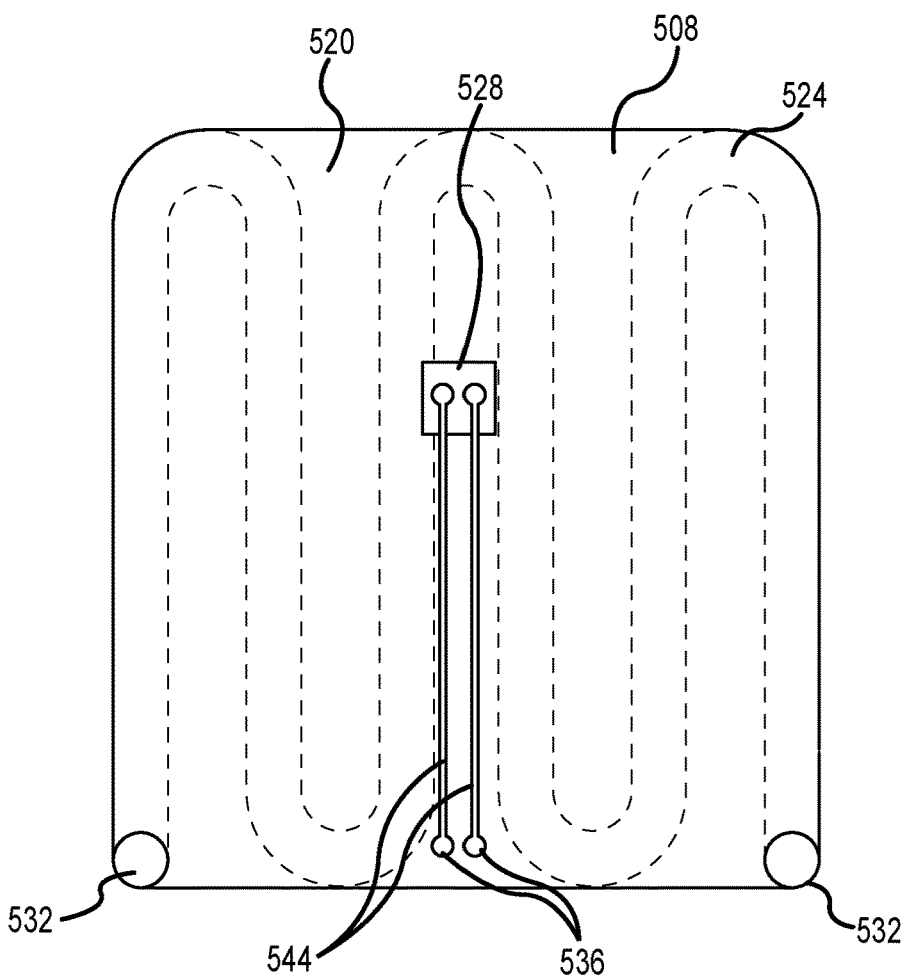
FIG. 6 depicts a blackbody element in accordance with embodiments of the present disclosure in a plan view.

FIGS. 5 and 6 depict components of a blackbody element 304 in accordance with embodiments of the present disclosure. More particularly, FIG. 5 depicts components of the blackbody element 304 in a side elevation view, and FIG. 6 depicts relative locations of components of the blackbody element 304 of FIG. 5 in a plan view. The blackbody element 304 generally includes a high emissivity structure 504 that includes a first substrate 508 and a plurality of nanotubes 512 extending from a first surface 516 of the first substrate 508. In accordance with embodiments of the present disclosure, the first surface 516 of the first substrate 508 generally lies along a first plane, and has a surface roughness with features having a size on the order of the wavelength of light to which the instrument 108 is sensitive. For example, a peak to valley distance of features of the first surface 516 can be about 20 μm for a sensor 108 operable within wavelengths that include infrared wavelengths. Carbon nanotubes 512, depicted in FIG. 5 in the aggregate as a rectangular box, extend in a direction normal to the plane of the surface 516. Each individual carbon nanotube may be about 10 nanometers in diameter, and about 200 μm long. Moreover, the carbon nanotubes 512 may be grouped or clumped together, forming packets or clumps that contain thousands of carbon nanotubes 512 and that each have an area with a dimension or dimensions in a plane parallel to the plane of the surface 516 on the order of the surface roughness of the surface 516.

Thermal management components can be arranged along or adjacent to a second surface 520 of the first substrate 508. The thermal management and components can include, for example, one or more heating elements 524 and one or more temperature sensors 528. A heating element 524 can comprise, for example and without limitation, a foil heater that includes traces of a resistive metal foil sandwiched between insulation layers. A temperature sensor 528 can comprise, for example and without limitation, a thermistor or thermocouple. An example of an arrangement of a heating element 524 and a temperature sensor 528 on the second surface 520 of the first substrate 508 is depicted in FIG. 6. As shown, the traces 524 can be arranged to promote even heating of the blackbody element 304. Also depicted are power supply contacts 532, for supplying power to the heating element 524, and signal contacts 536, for transmitting signals between the temperature sensor 528 and the control electronics 312.

With reference again to FIG. 5, the thermal management components 524 and 528 can be sandwiched between the first substrate 508 and a second substrate 540. The second substrate 540 can provide structural support to other components of the blackbody element 304, and can further provide conductors 544, for example in the form of electrically conductive vias or traces, to support the transmission of electrical power or signals between components of the blackbody element 304 and the contacts or electrodes 532 and 536. In accordance with still other embodiments of the present disclosure, the second substrate 540 can be thermally conductive.

In addition, although at least some embodiments incorporate blackbody elements 304 as discrete, separable components, it is also possible to provide blackbody elements 304 that share at least some structures. For example, one or more substrates 508 and 540 can extend across multiple blackbody elements 304, to form an array or a sub-array of blackbody elements 304 that can form all or a portion of a calibration surface 120. Although such embodiments can include blackbody elements 304 that are at least in part physically integral to one another, the areas of the different blackbody elements 304 remain associated with individual monitoring of the temperature of the respective elements, and individual control of the temperature of those respective elements.

Figure 7:
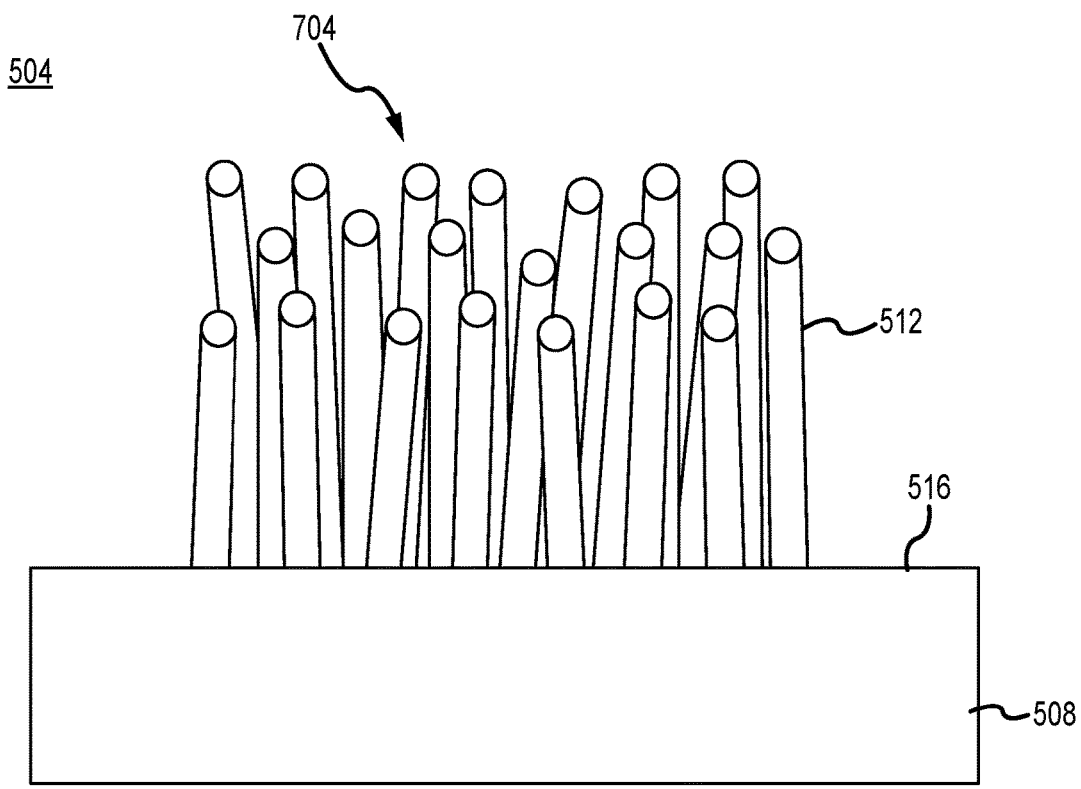
FIG. 7 depicts a high emissivity structure of a blackbody element in accordance with embodiments of the present disclosure.

FIG. 7 depicts a section of a high emissivity structure 504 of a blackbody element 304 in accordance with embodiments of the present disclosure, that includes a grouping or clump 704 containing a number of individual carbon nanotubes 512. The individual carbon nanotubes 512 extend from the first surface 516 of the first substrate 508 in a direction that is generally normal to the first surface 516. In accordance with further embodiments of the present disclosure, the individual carbon nanotubes 512 can be inclined with respect to the direction normal to the first surface 516. Moreover, the individual carbon nanotubes 512 can be curved, as opposed to being perfectly straight. It should be noted that the components depicted in FIG. 7 are not to scale, as the typical length to width ratio of the carbon nanotubes 512 is around 10,000:1.

Figure 8:
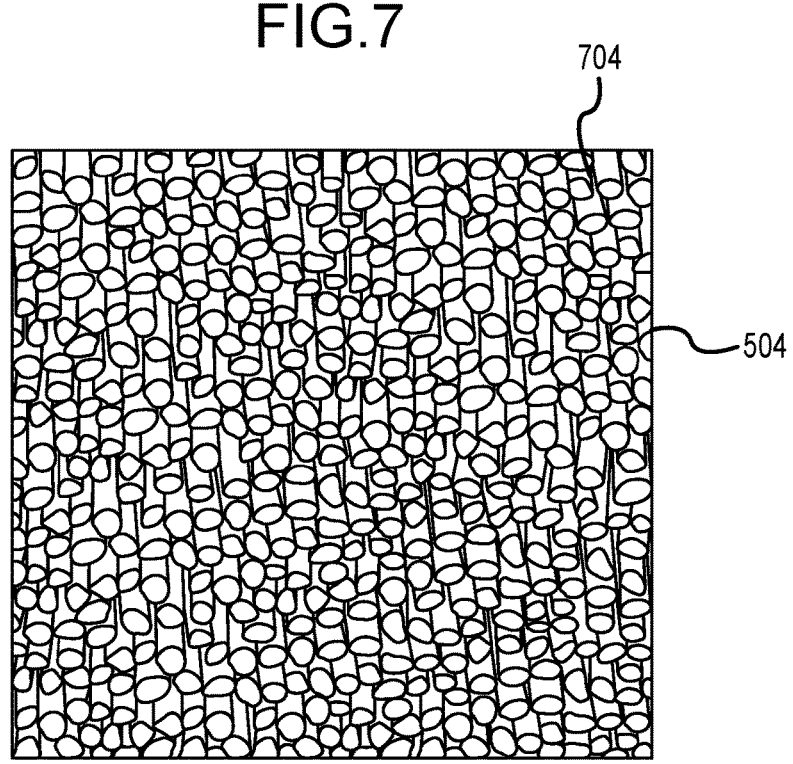
FIG. 8 illustrates details of a high emissivity structure of a blackbody element in accordance with embodiments of the present disclosure.

FIG. 8 is a photograph of a section of a surface of an exemplary high emissivity structure 504 of a blackbody element 304 in accordance with embodiments of the present disclosure. More particularly, the figure illustrates groupings 704 of carbon nanotubes 512.

Figure 9:
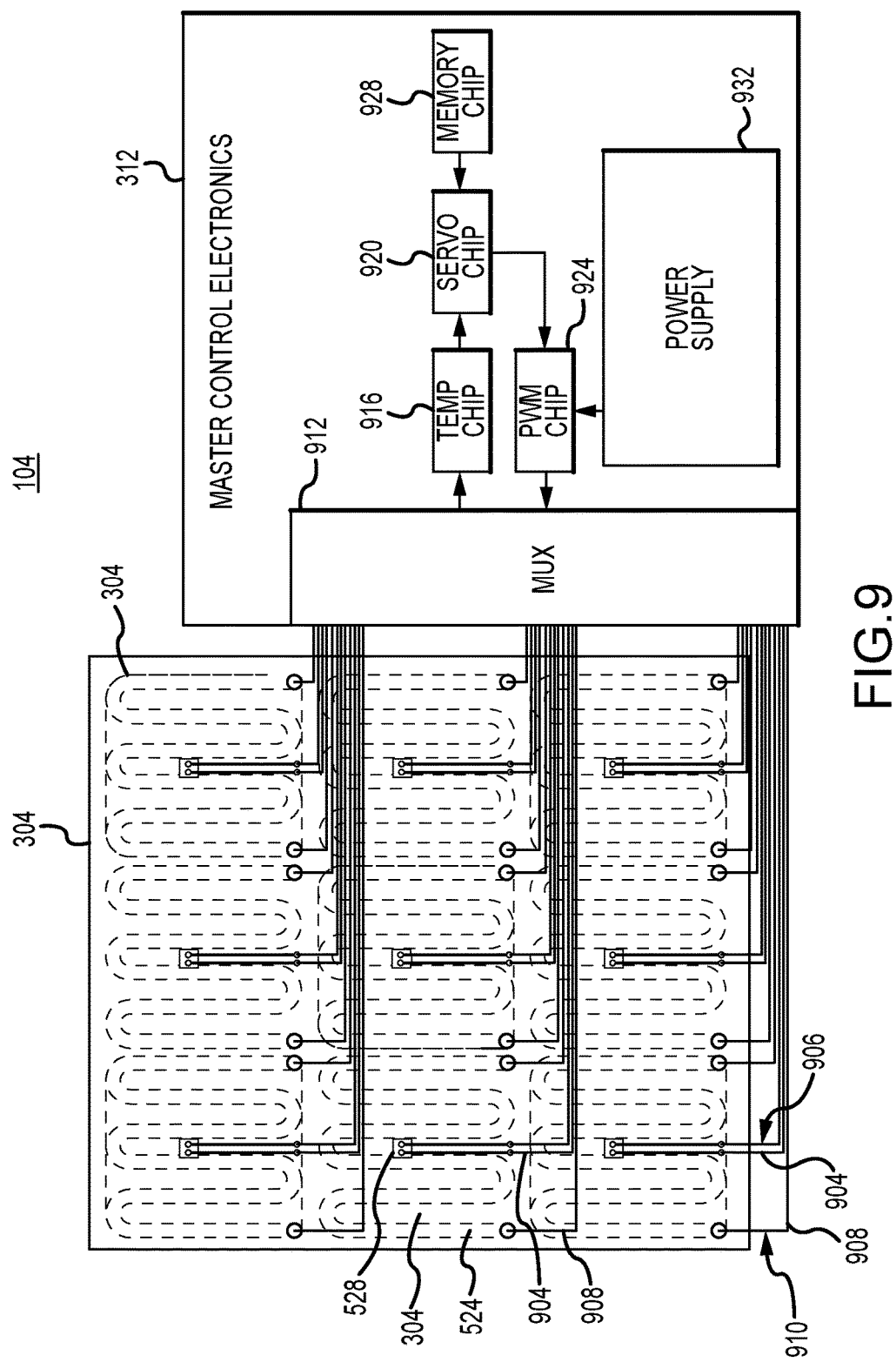
FIG. 9 is a block diagram depicting components of a calibration system in accordance with embodiments of the present disclosure.

FIG. 9 is a block diagram depicting components of a calibration device or system 104 in accordance with embodiments of the present disclosure. In this example configuration, individual blackbody elements 304 are connected to control electronics 312 via individual signal lines 904, provided as part of a signal line network 906, and individual power supply lines 908, provided as part of a power network 910. As an example, but without limitation, the various signal and power supply lines 904 and 908 can be provided by the first substrate 308. The control electronics 312 generally include a multiplexer 912 to connect the signal and power supply lines 904 and 908, provided as part of networks 906 and 910, to various processors or chips, including but not limited to a temperature sensing chip 916, a servo chip 920, and a pulse width modulation chip 924. The various chips can additionally be interconnected to memory 928. In general, the temperature sensing chip 916 determines the temperature of the individual blackbody elements 304, based on signals received from the temperature sensor or sensors 528 of the individual blackbody elements 304. The pulse width modulation chip 924 provides power to the heating element or elements 524 of the individual blackbody elements 304. More particularly, signals provided from the temperature chip 916 regarding the temperature of individual blackbody elements 304 are provided to the servo chip 920, which provides signals to the pulse width modulation chip 924 regarding the heating requirements associated with individual blackbody elements 304. The control electronics 312 can additionally include a power supply 932.

Figure 10:
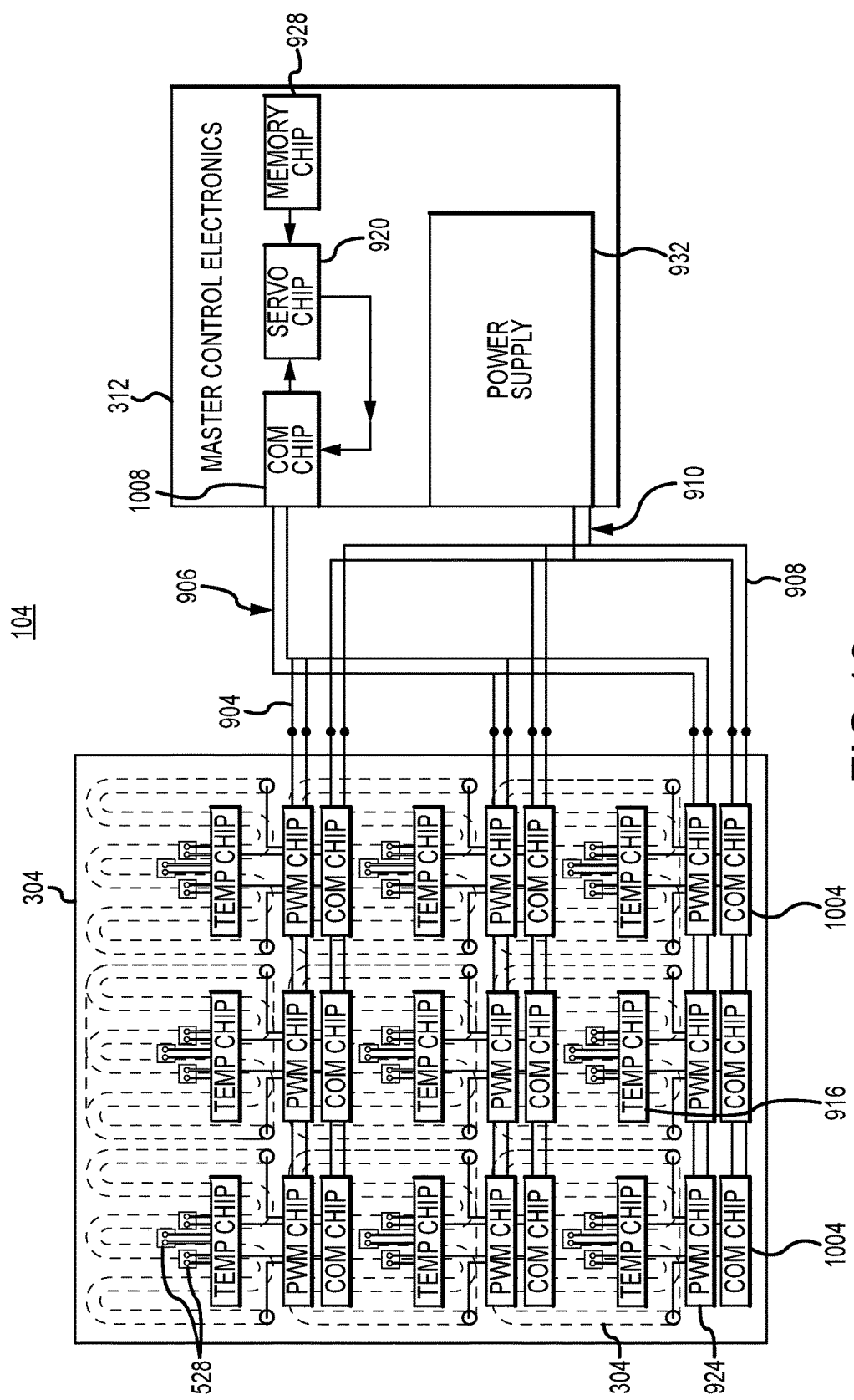
FIG. 10 is a block diagram depicting components of a calibration system in accordance with other embodiments of the present disclosure.

FIG. 10 is a block diagram depicting components of a calibration system 104 in accordance with other embodiments of the present disclosure. More particularly, this embodiment features a hybrid control arrangement, with temperature sensing chips 916 and pulse width modulation chips 924 distributed amongst the blackbody elements 304. For example, each blackbody element 304 can include or be connected to a temperature sensing chip 916 and a pulse width modulation chip 924. In this configuration, each blackbody element 304 also includes or is associated with a communication chip 1004, to enable communications addressed to particular blackbody elements 304 to be sent over a shared communication or signal line network 906. In addition, by providing individual communication chips 1004 and individual pulse width modulation chips 924, the blackbody elements 304 can also share power supply lines 908 provided as part of a power supply network 910. The control electronics 312 in such a configuration can include a control side communication chip 1008, a servo chip 920 to provide signals to the communication chip 1008 for delivery to individual blackbody elements 304 regarding heating operations, and a memory chip 928. The configuration of a calibration device 104 depicted in FIG. 10 also illustrates blackbody elements 304 that include multiple temperature sensors 528 in each blackbody element 304. As can be appreciated by one of skill in the art after consideration of the present disclosure, the use of multiple temperature sensors 528 is not limited to a hybrid control arrangement, and likewise a hybrid control arrangement does not require multiple temperature sensors 528. The control electronics 312 can additionally include a power supply 932.

Figure 11:
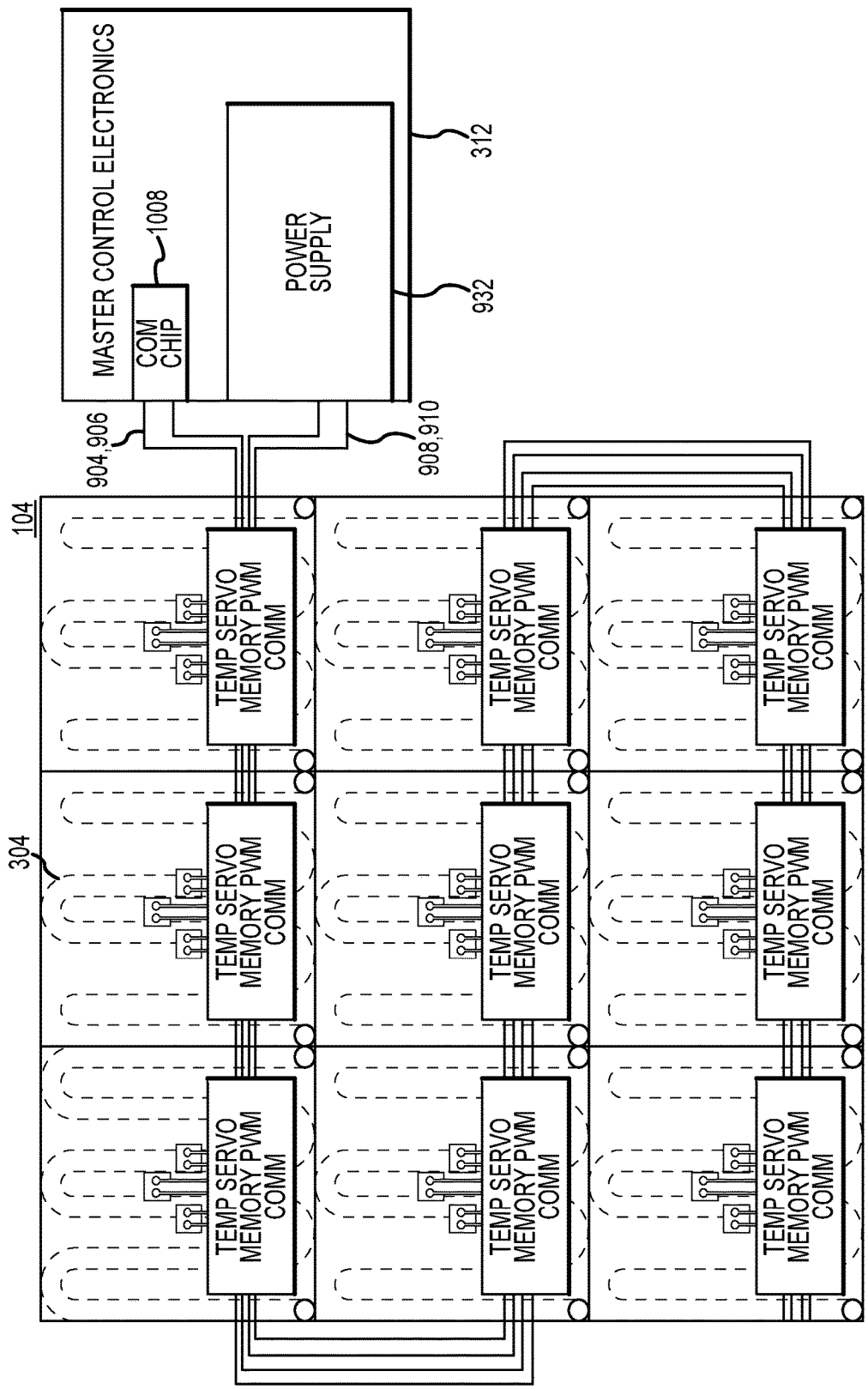
FIG. 11 is a block diagram depicting components of a calibration system in accordance with still other embodiments of the present disclosure.

FIG. 11 is a block diagram depicting components of a calibration system 104 in accordance with still other embodiments of the present disclosure. In this embodiment, the processing concerning temperature sensing and control is distributed amongst the blackbody elements 304. Accordingly, each blackbody element 304 includes one or more integrated circuits or chips 1104 for performing temperature sensing chip 916, servo chip 920, pulse width modulation chip 924, memory chip 928, and communication chip 1004 functions. The control electronics 312 can include a communications chip 1008, for example for providing basic operational (e.g. power on or off) signals to the array of blackbody elements 304. In addition, the control electronics 312 can include a power supply 932. The control electronics 312 are addressably connected to the blackbody elements 304 by shared signal lines 904 provided as part of a signal line network 906, and power is supplied from the control electronics 312 to the blackbody elements 304 by power supply lines 908 included in a power network 910.

The various example configurations of calibration systems 104 depicted in FIGS. 9-11 are each shown with a square array of nine blackbody elements 304; however, it should be appreciated that a calibration system 104 as described herein can include any number of blackbody elements 304. In accordance with still other embodiments of the present disclosure, a calibration system 104 can be formed using a number of sub-systems that each include control electronics 312 and an array of blackbody elements 304 interconnected to the control electronics. Moreover, arrangements of components other than those depicted in the figures are possible. For instance, a calibration system 104 could include sub-systems that incorporate the same or different configurations of control chips, and that share a common power supply. Other variations of calibration system 104 configurations are also possible. For instance, individual blackbody elements 304 can include communication chips 1004 that communicate wirelessly with an associated control electronics 312 communication chip.

Figure 12:
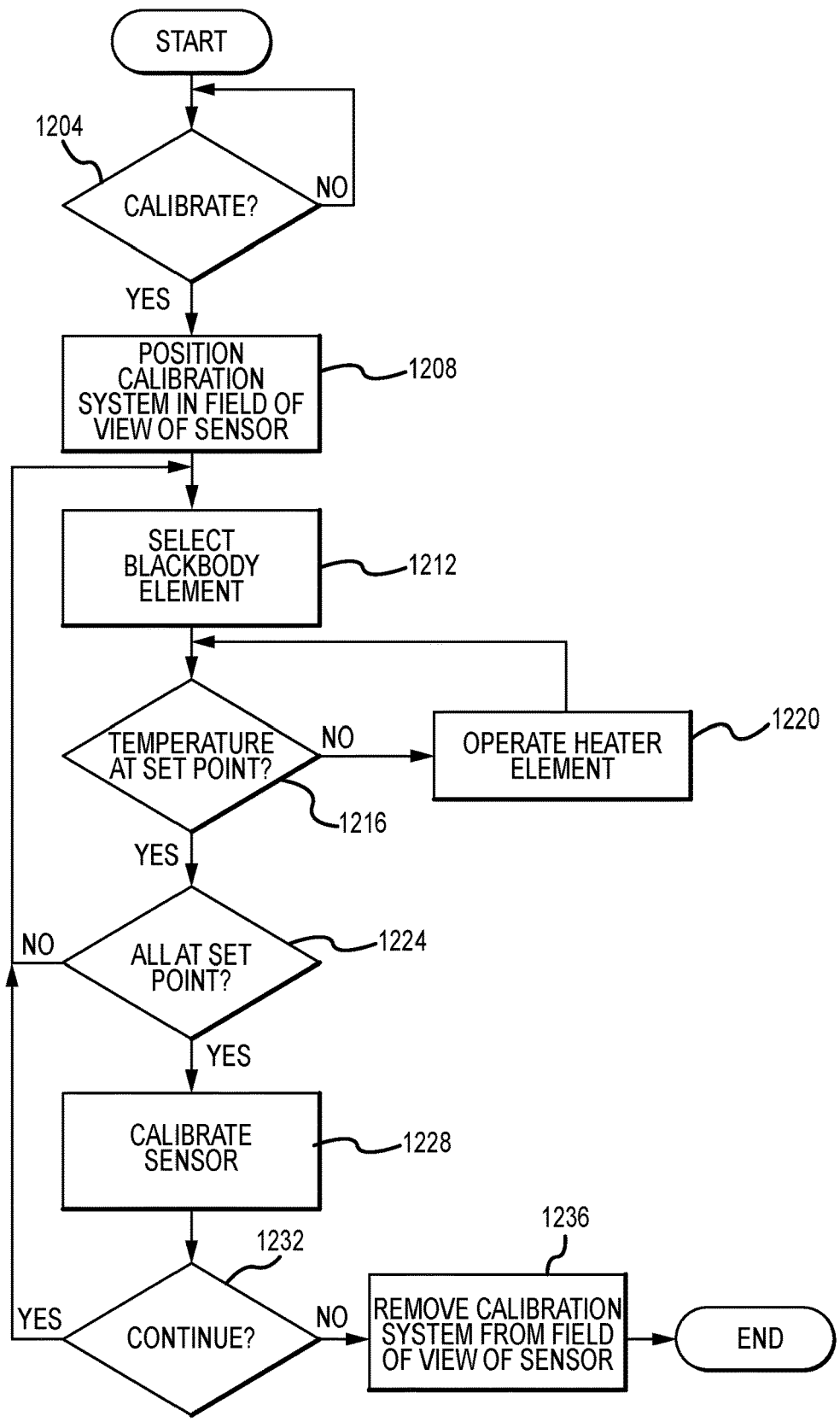
FIG. 12 is a flowchart depicting aspects of a method of calibrating an instrument in accordance with embodiments of the present disclosure.

Aspects of the operation of a calibration system 104 in accordance with embodiments of the present disclosure are depicted in FIG. 12. Initially, at step 1204, a determination may be made as to whether a sensor instrument 108 associated with the calibration system 104 requires calibration. Once a determination that calibration is required has been made, the calibration system 104 is placed within the field of view 124 of the sensor 108 (step 1208). Placing the calibration system 104 within the field of view 124 of the sensor 108 can be accomplished in various ways, depending on the configuration of the sensing system 100. For example, a shroud containing a mirror 132 can be rotated to direct the field of view 124 of the sensor 108 towards the calibration system 104, rather than to a target scene 128. As another example, a calibration system 104 provided as a shutter can be rotated or swung from a position outside of the field of view 124 of the sensor 108 to a position covering the field of view 124 of the sensor 108.

An individual blackbody element 304 is then selected (step 1212), and the temperature of the selected blackbody element 304 is then compared to a desired setpoint (step 1216). If the temperature of the selected blackbody element 304 is less than a selected setpoint, the heater element 524 associated with that blackbody element 304 is operated, to raise the temperature of the blackbody element 304 (step 1220). In accordance with at least some embodiments of the present disclosure, if the temperature of the selected blackbody element 304 is higher than a selected setpoint, the heater element 524 associated with that blackbody element 304 is turned off and the refrigeration circuit or thermoelectric cooler associated with a heat transfer plate 320 is used to lower the temperature of the blackbody element 304. Once the desired temperature is reached the heaters are selectively activated for precise thermal control at the desired temperature.

The process can then return to step 1216, to determine whether the desired setpoint temperature has been reached. If the setpoint temperature has been reached, or after initiating operation of the heating element 324, a determination can be made as to whether all or a minimum number of blackbody elements 304 have reached a selected setpoint temperature (step 1224). If the blackbody elements 304 have reached the setpoint temperature, the sensor 108 can be calibrated (step 1228). If a determination is made that a minimum number of blackbody elements 304 have not reached the setpoint temperature, the process can return to step 1212, and the next blackbody element 304 can be selected. In accordance with embodiments of the present disclosure, the process of determining a temperature of and selectively operating heating elements 524 associated with individual blackbody elements 304 can be performed for multiple blackbody elements 304 in parallel. In addition, it should be appreciated that the setpoint temperature may be selected from a number of setpoint temperatures. For example, a setpoint temperature may be selected from a possible set or range of setpoint temperatures depending on an operational wavelength or range of wavelengths of a sensor 108.

After sensor 108 calibration, a determination can be made as to whether operation of the calibration system 104 is to be continued (step 1232). If operation is to be continued, the process can return to step 1212. If operation of the calibration system 104 is to be discontinued, the calibration system 104 can be removed from the field of view 124 of the sensor 108 (step 1236), and the calibration process can end.

In accordance with embodiments of the present disclosure, thermal control of the calibration system 104 can be continued, even when the calibration system 104 has not been placed in the field of view 124 of the instrument 108. Moreover, thermal control of the calibration surface 120 can include the removal of energy from the blackbody elements 304, in place of or in addition to the addition of energy to the blackbody elements 304. For instance, the second substrate 316 can be actively cooled, to remove heat energy from the blackbody elements 304. Cooling can be performed with respect to the entire array of blackbody elements 304, or with respect to selected zones of the array of blackbody elements 304.

Accordingly, the embodiments of the present disclosure allow blackbody elements 304 to be individually monitored and controlled to establish and maintain a desired temperature across the entire calibration surface of the calibration device 104. Therefore, high uniformity in temperature across the calibration device 104 can be achieved. Moreover, high uniformity can be achieved even where the calibration device 104 is subject to uneven heat loads. In addition, different set point temperatures can be selected and applied during a calibration session, to facilitate calibration over a range of wavelengths.

Embodiments of the present disclosure provide an integrated large aperture, carbon nanotube blackbody calibration system for providing stable, uniform, and precise calibration of a sensor over a large temperature (e.g., 250-450 K) and wavelength range (e.g., 3-14 microns). One challenge with a carbon nanotube plate blackbody is that it radiates to the ambient environment much more efficiently than a conventional blackbody. This effect is compounded by the lower thermal mass enabled by embodiments of the present disclosure. According to embodiments of the present disclosure, thermal control of the high emissivity surface 120 can be maintained by operating a tuned open-loop heater control, such as may be implemented by control electronics 312. For example, heater power can be adjusted just prior to opening of the shutter so that the resultant temperature of the carbon nanotube high emissivity surface 120 is more stable than if such control were not provided. This requires tuning of the heater parameters at each temperature setpoint and over the range of environment temperatures, but the benefits are a blackbody with similar temperature stability to conventional cavity type blackbodies, while enabling high emissivity surfaces 120 having a small mass and a large area relative to conventional cavity type blackbodies.

In accordance with embodiments of the present disclosure, each blackbody element 304 or hixel includes a dense array of carbon nanotubes (CNT) 512 formed on a substrate 508. The substrate 508 may be in the form of a thick-film substrate formed from, for example, silicon carbide. The CNTs 512 can have longitudinal axes oriented off-normal to a surface 516 of the substrate 508. Moreover, the plurality of carbon nanotubes 512 can be non-parallel to each other. In addition, each single carbon nanotube in the array of carbon nanotubes 512 is anchored to the substrate 508 and free at the other end. The carbon nanotubes can be grown at random orientations to one another on a textured, multi-faceted, non-uniform surface such as silicon carbide grain boundaries, deformed from a vertically aligned CNT array through post processing, or both.

The high emissivity calibration surface formed by the plurality blackbody elements 504 emits blackbody radiation along the longitudinal axes towards the sensor 108 under calibration, and can provide calibration of the sensor 108 at different surface temperatures. Additional aspects of the calibration device 104 include the creation of pixelated, stitched or tiled calibration surface consisting of an array of blackbody elements 304, with the option to scale the calibration surface area, and individual monitoring and control of the temperature of the blackbody elements 504 using smart electronics. Each blackbody element 304 or hixel can include a substrate heating element layer integrated into or on the second side of a thick-film substrate layer, and one or a plurality of temperature sensors. The blackbody elements 304 are interconnected to control electronics 312 that are used to servo-temperature-control each individual blackbody element 304 to maintain a uniform temperature across the array of blackbody elements 304.

Additionally, the flat-plate type configuration of a calibration system 104 as disclosed herein simplifies instrument design, is advantageous for on-board calibration due to its low SWaP, and reduces or eliminates the fabrication and coating difficulties associated with the complex geometry of conventional cavity type blackbodies.

As part of this disclosure, examples of blackbody elements 304 have been described. Such blackbody elements may be referred to as heater blackbody radiation pixel elements, or "hixels". The configuration of the described blackbody elements enables the control of the heating and therefore uniformity of the emitted radiation over discrete areas of the calibration surface provided by the array of blackbody elements 304. The actual extent of the area of each blackbody element 304 can be selected based on the desired control resolution of the temperature of the calibration surface 120. In particular, a relatively small blackbody element 304 area can be utilized where relatively fine (i.e. high resolution) control of temperature over the calibration surface 120 is desired. Each hixel can include at least one heating element and at least one temperature sensor. In addition, the at least one heating element of each hixel can be controlled independently of any other hixel. This hixel control enables scaling of the technology to larger sizes by compensating for variations in thermal conductance, emissivity, and heater efficiency.

The foregoing discussion of the invention has been presented for purposes of illustration and description. Further, the description is not intended to limit the invention to the form disclosed herein. Consequently, variations and modifications commensurate with the above teachings, within the skill or knowledge of the relevant art, are within the scope of the present invention. The embodiments described hereinabove are further intended to explain the best mode presently known of practicing the invention and to enable others skilled in the art to utilize the invention in such or in other embodiments and with various modifications required by the particular application or use of the invention. It is intended that the appended claims be construed to include alternative embodiments to the extent permitted by the prior art.

What is claimed is:

1. A calibration device, comprising:
   a plurality of blackbody elements, wherein each blackbody element includes:
      a blackbody element substrate;
      a plurality of nanotubes extending from a first surface of the blackody element substrate and forming a blackbody surface; and
      a heating element; and
   a first substrate, wherein each blackbody element in the plurality of blackbody elements is interconnected to the first substrate, wherein the first substrate includes wirings electrically connected to the blackbody elements, wherein at least one edge of each blackbody element in the plurality of blackbody elements is adjacent to an edge of at least one neighbor blackbody element, and wherein the blackbody surface of each blackbody element in the plurality of blackbody elements forms a portion of a calibration surface.

2. The device of claim 1, wherein the blackbody element substrate and the plurality of nanotubes of each blackbody element in the plurality of blackbody elements form a high emissivity structure.

3. The device of claim 1, wherein each blackbody element further includes:
   a temperature sensor.

4. The device of claim 3, wherein the plurality of blackbody elements are arranged in a two-dimensional array to form a composite high emissivity surface.

5. The device of claim 1, further comprising:
   control electronics, wherein the wirings of the first substrate electrically connect the blackbody elements to the control electronics.

6. The device of claim 5, further comprising:
   a second substrate, wherein the first substrate is between the blackbody elements and the second substrate.

7. The device of claim 6, wherein the second substrate is a heat transfer plate.

8. The device of claim 5, wherein the wirings of the first substrate provide an independent communication path between the control electronics and each of the blackbody elements.

9. The device of claim 1, wherein each blackbody element in the plurality of blackbody elements is connected to a power supply.

10. The device of claim 9, wherein each blackbody element in the plurality of blackbody elements includes an addressable communication chip.

11. The device of claim 10, wherein each blackbody element in the plurality of blackbody elements further includes a pulse width modulation chip.

12. The device of claim 11, wherein the device further includes a communication chip, and wherein the communication chip of the device is in communication with the addressable communication chip of each blackbody element in the plurality of blackbody elements.

13. The device of claim 1, wherein each of the nanotubes has a first end and a second end, wherein for each blackbody element the first ends of each of the nanotubes are connected to the first surface of the substrate and the second ends of at least some of the nanotubes point in different directions.

14. The device of claim 1, wherein the first surface of the blackbody substrate of each blackbody element in the plurality of blackbody elements has a surface roughness with features having a size on an order of a selected wavelength of light.

15. A calibration system, comprising:
   a support structure;
   an optical system;
   a blackbody calibration surface interconnected to the support structure, the blackbody calibration surface, including:
      a plurality of blackbody elements, each blackbody element including:
         a blackbody substrate;
         a plurality of nanotubes extending from a first surface of the blackbody substrate and forming a blackbody surface;
         a heating element that is at least one of embedded in or on a second side of the blackbody substrate; and
         a temperature sensor;
   control electronics; and
   a signal line network, wherein at least portions of the signal line network are formed as part of the support structure, wherein each blackbody element in the plurality of blackbody elements is connected to the control electronics by the signal line network, wherein at least one edge of each blackbody element in the plurality of blackbody elements is adjacent to an edge of at least one neighbor blackbody element, and wherein the blackbody surface of each blackbody element in the plurality of blackbody elements forms a portion of the blackbody calibration surface.

16. The system of claim 15, further comprising:
   a power supply; and
   a power supply network, wherein each blackbody element in the plurality of blackbody elements is connected to the power supply by the power supply network.

17. The system of claim 16, wherein the at least portions of the signal line network and at least portions of the power supply network are incorporated into a substrate that is provided as part of the support structure and that is in contact with each of the blackbody elements.

18. A calibration method, comprising:
   providing a high emissivity surface formed from an array that includes a plurality of blackbody elements interconnected to a first substrate, wherein each blackbody element in the plurality of blackbody elements includes:
      a blackbody substrate;

a high emissivity surface formed from a plurality of nanotubes extending from a first surface of the blackbody substrate;

a heating element; and a temperature sensor, wherein at least one edge of each blackbody element in the array of blackbody elements is adjacent to an edge of at least one neighbor blackbody element;

placing the high emissivity surface within a field of view of an instrument to be calibrated; and controlling a temperature of the high emissivity surface, wherein controlling the temperature of the high emissivity surface includes individually sensing and controlling a temperature of each of the blackbody elements in the plurality of blackbody elements through wirings at least partially formed in the first substrate.

19. The method of claim 18, further comprising:

while controlling the temperature of the high emissivity surface, calibrating the instrument.

20. The method of claim 19, further comprising:

after calibrating the instrument, removing the high emissivity surface from the field of view of the instrument.

21. The method of claim 18, wherein a temperature of each of the blackbody elements is independently sensed and controlled.

* * * * *